US007955211B2

(12) United States Patent
Okamuro et al.

(10) Patent No.: US 7,955,211 B2
(45) Date of Patent: Jun. 7, 2011

(54) AXLE ASSEMBLY

(75) Inventors: Kenneth Okamuro, Statesville, NC (US); Robert Joeseph Brazeau, Kalamazoo, MI (US); Pratish Prabhakar Malushte, Maharashtra (IN)

(73) Assignee: Dana Heavy Vehicle Systems Group, LLC, Maumee, OH (US)

(*) Notice: Subject to any disclaimer, the term of this patent is extended or adjusted under 35 U.S.C. 154(b) by 449 days.

(21) Appl. No.: 11/998,763

(22) Filed: Nov. 29, 2007

(65) Prior Publication Data

US 2008/0076618 A1 Mar. 27, 2008

Related U.S. Application Data

(63) Continuation-in-part of application No. 11/368,272, filed on Mar. 3, 2006, now Pat. No. 7,465,246.

(51) Int. Cl.
*F16H 48/06* (2006.01)

(52) U.S. Cl. .................................................... 475/230

(58) Field of Classification Search .................. 475/230
See application file for complete search history.

(56) References Cited

U.S. PATENT DOCUMENTS

| | | | | |
|---|---|---|---|---|
| 3,980,151 A | | 9/1976 | Murayama et al. | |
| 4,301,886 A | | 11/1981 | Kinoshita et al. | |
| 4,442,914 A | * | 4/1984 | Nishihara | 180/255 |
| 4,516,654 A | * | 5/1985 | Nishihara | 180/255 |
| 4,553,624 A | * | 11/1985 | Yoshii | 180/255 |
| 4,597,468 A | | 7/1986 | Friedrich | |
| 4,613,011 A | * | 9/1986 | van der Lely | 180/261 |
| 5,041,069 A | | 8/1991 | Horst | |
| 5,741,027 A | | 4/1998 | Stroh et al. | |
| 5,810,377 A | | 9/1998 | Keeler et al. | |
| 6,237,708 B1 | | 5/2001 | Kawada | |
| 6,302,233 B1 | | 10/2001 | Okamuro et al. | |
| 6,641,150 B1 | | 11/2003 | Schlosser et al. | |
| 6,675,925 B2 | | 1/2004 | Takahashi et al. | |
| 6,681,878 B2 | | 1/2004 | Nagata et al. | |
| 7,290,637 B2 | | 11/2007 | Nagata et al. | |
| 2004/0235606 A1 | | 11/2004 | Brossard | |

FOREIGN PATENT DOCUMENTS

| | | |
|---|---|---|
| JP | 57070734 | 5/1982 |
| JP | 57-104414 | 6/1982 |
| JP | 58-008433 | 1/1983 |
| JP | 60-154913 | 8/1985 |
| JP | 05-270288 | 10/1993 |
| WO | WO 03/080366 A2 | 10/2003 |

* cited by examiner

*Primary Examiner* — Ha D. Ho
(74) *Attorney, Agent, or Firm* — Marshall & Melhorn, LLC

(57) ABSTRACT

A drive axle assembly has at least one axle arm portion extending from a differential housing to a shoulder structure that is unitary with the outboard end of the axle arm portion. The shoulder structure houses a first bevel bear and a second bevel gear. Openings adjacent the bevel gears are selectively closed with covers.

8 Claims, 9 Drawing Sheets

AXLE ASSEMBLY

RELATED APPLICATION

This application is a continuation-in-part of U.S. application Ser. No. 11/368,272, filed on Mar. 3, 2006, now U.S. Pat. No. 7,465,246 which is incorporated by reference in its entirety.

FIELD OF THE INVENTION

The present invention relates to an axle assembly. More specifically, the present invention relates to an axle assembly for a front drive steer axle assembly of a vehicle.

SUMMARY OF THE INVENTION

In one embodiment, an axle arm portion extends from a differential housing to a shoulder structure. The shoulder structure is unitary with an outboard end of the axle arm portion. The shoulder structure houses a first and a second bevel gear. A first opening in the shoulder structure is located above the second bevel gear. A second opening in the shoulder structure is located outboard from the first bevel gear. The first and second openings are selectively closeable by separate covers.

BRIEF DESCRIPTION OF THE FIGURES

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions or other physical characteristics relating to the embodiments disclosed are not to be considered as limiting.

Figure 1:
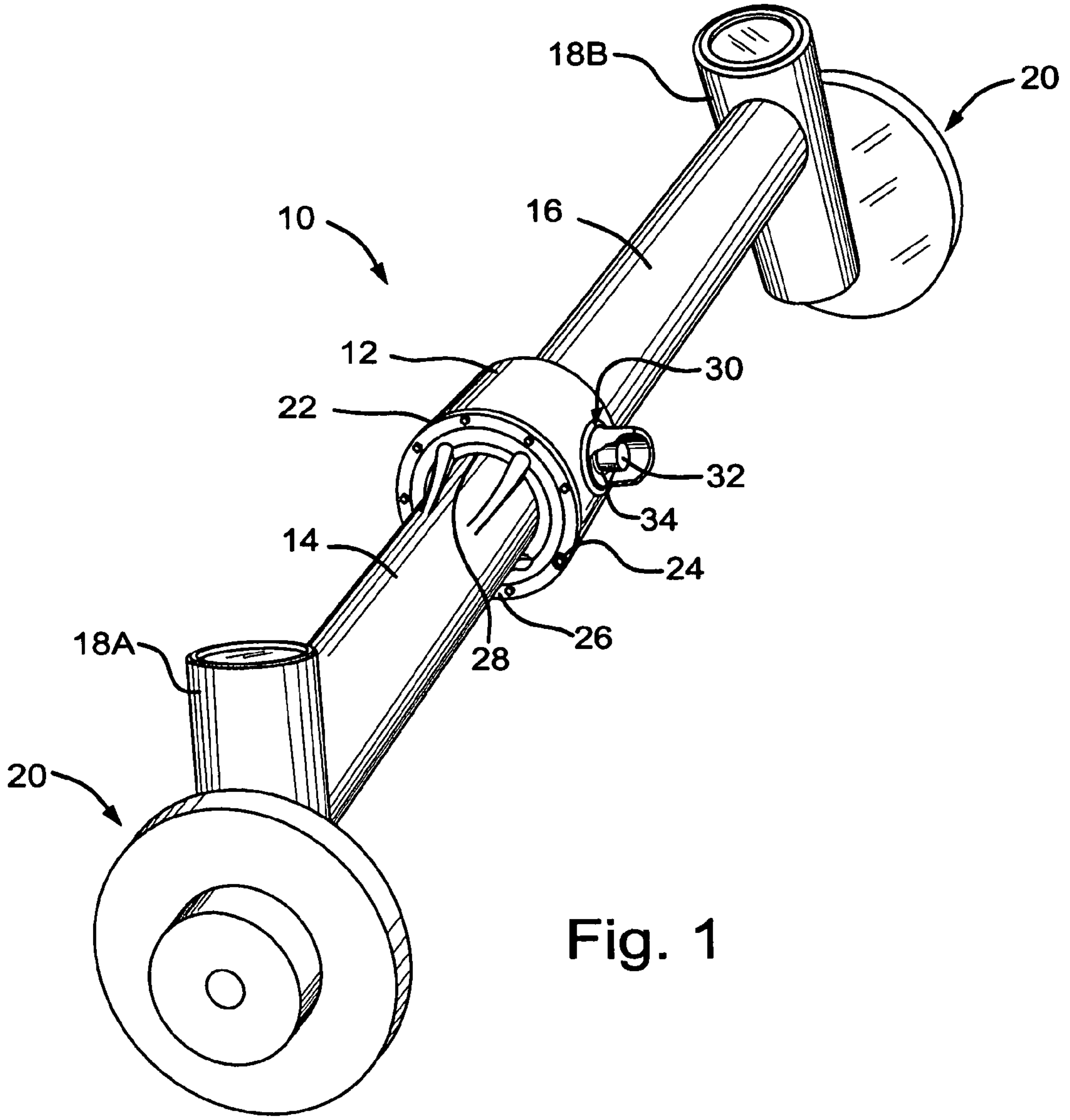
FIG. 1 is a schematic, perspective view of one embodiment of the present invention.

FIG. 1 depicts a schematic, perspective view of one embodiment of the present invention. More specifically, FIG. 1 depicts an axle assembly 10 comprising a center section 12, a first axle arm portion 14 and a second axle arm portion 16, both of which axially extend from the center section 12, and a shoulder structure 18 located at the end of each axle arm portion 14, 16. A wheel end 20, as known by those skilled in the art, is depicted adjacent each shoulder structure 18A and 18B.

The first axle arm portion 14 is secured to a housing joint 22. The first axle arm portion 14 is preferably integrally formed and unitary with the housing joint 22 so as to comprise a single component. It is within the scope of the present invention, however, to separately form the first axle arm portion 14 and subsequently attach it to the housing joint 22.

The housing joint 22 has a plurality of circumferentially located apertures 24 for receiving mechanical fasteners 26, such as bolts. The mechanical fasteners 26 are located through the apertures 24 and into center section 12 to secure the housing joint 22 to the center section 12.

The housing joint 22 and the first axle arm portion 14 can be secured to the center section 12 after the ring gear, pinion gears, side gears, bearings, seals, and lubricating fluid, all described in more detail below, are installed in the center section 12.

In one embodiment, one or more ribs 28, located circumferentially about the first axle arm portion 14, connect the first axle arm portion 14 with the housing joint 22, as shown in FIG. 1. Preferably, a plurality of ribs 28 that are integrally formed with both the first axle arm portion 14 and the housing joint 22 are used. Those skilled in the art will appreciate that the present invention functions equally well without the ribs 28.

The second axle arm portion 16 is preferably integrally formed and unitary with the center section 12. More preferably, the second axle arm portion 16 is one-piece with the center section 12. The second axle arm portion 16 may have a plurality of ribs (not shown) that are integrally formed with the second axle arm portion 16 and the center section 12, but the present invention is not limited to such ribs.

It is within the scope of the present invention to utilize a housing joint (not shown) to connect the second axle arm portion 16 with the center section 12. It is preferred, however, that only a single housing joint, as described above, be utilized in the present invention and that the second axle arm portion 16 is integrally formed directly with the center section 12.

Based on the above, it can be appreciated that the traditional axle housing shoulder joint connecting the axle arm portions 14, 16 to the center section 12 and the housing joint 22 have been eliminated.

The present invention includes means for accepting a power tie rod, as known by those skilled in the art (not shown), or a steer cylinder and tie rod (not shown), also as known by those skilled in the art, at each wheel end 20.

The center section 12 has an opening 30 for receiving a drive pinion shaft 32. The drive pinion shaft 32 is driven by a prime mover (not shown), such as an internal combustion engine, or the like, as known by those skilled in the art. It is preferred that at least one seal 34 be located about the drive pinion 32 adjacent the opening 30 to prevent lubricating fluids in the center section 12 from escaping.

The drive pinion shaft 32 is rotatingly mounted within the center section 12. The drive pinion shaft 32 is mounted for rotation within the center section 12 with at least two tapered bearings (not shown). Those skilled in the art will appreciate that a greater number of bearings or a fewer number of bearings may be used without departing from the scope of the invention.

Figure 2:
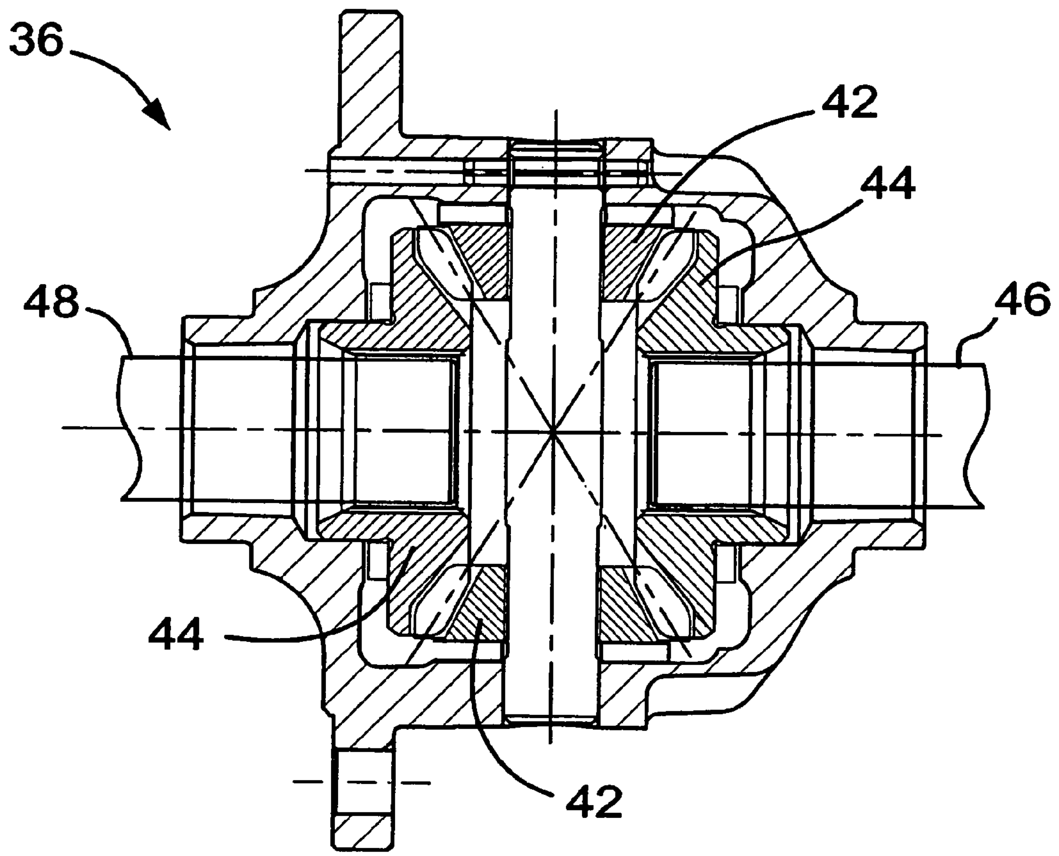
FIG. 2 is a partial schematic, cut-away view of a component of the present invention.

A differential 36 for mounting in the center section 12 is depicted in FIG. 2. Those skilled in the art will appreciate that the drive pinion shaft 32 engages with a ring gear (not shown) that is secured to the differential 36.

The ring gear is drivingly connected to pinion gears 42 and side gears 44, as known to those skilled in the art, for driving a first axle shaft 46 and a second axle shaft 48. The first axle shaft 46 and the second axle shaft 48 are partially depicted in FIG. 2. Those skilled in the art will appreciate that the first axle shaft 46 and the second axle shaft 48 extend to the shoulder structures 18, as will be discussed in more detail below. The shafts 46, 48 are substantially horizontal.

Those skilled in the art will appreciate that lubricating fluid, such as oil, is located within the center section 12. Seals may be located around the first axle shaft 46 and the second axle shaft 48 to prevent the lubricating fluid from escaping from the center section 12. It is also within the scope of the present invention to allow the lubricating fluid to flow into the axle arm portions 14, 16.

Both the first and second axle shafts 46, 48 extend from the center section 12 to the shoulder structures 18A and 18B within the first axle arm portion 14 and the second axle arm portion 16, respectively. As shown in FIG. 1, the first axle arm portion 14 and the second axle arm portion 16 are preferably substantially enclosed.

The first axle arm portion 14 is preferably integrally formed with the shoulder structure 18A and the second axle arm portion 16 is preferably integrally formed with a shoulder structure 18B. More preferably, the portions 14 and 16 are integrally formed and unitary with the shoulder structures 18A and 18B.

Figure 3:
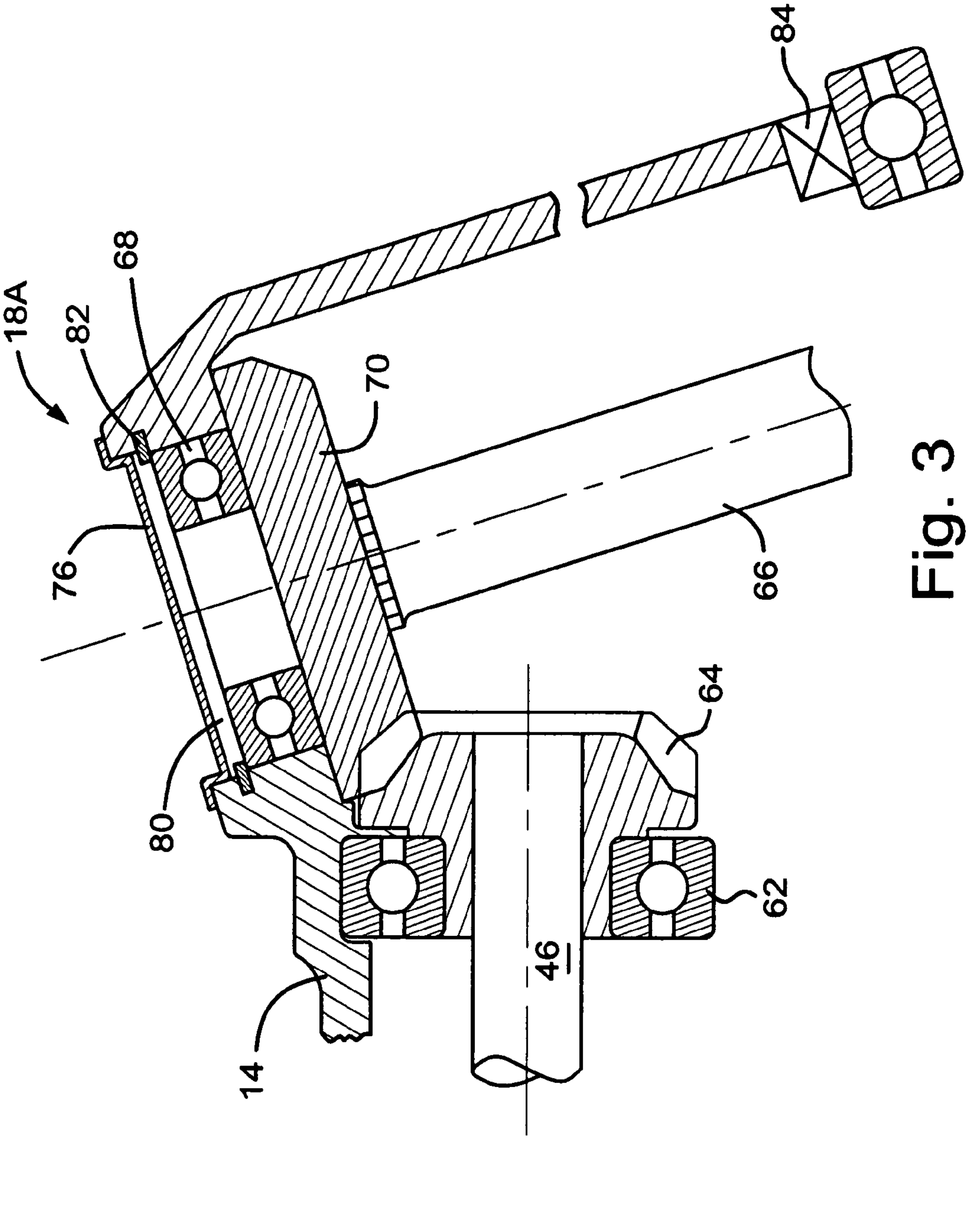
FIG. 3 is a partial schematic, cut-away view of another component of the present invention.

FIG. 3 depicts a schematic, partial side view of one of the axle arm portions 14, a shoulder structure 18A and the axle shaft 46 within the axle arm portion 14. The axle shaft 46 is mounted for rotation within the axle arm portion 14 with at least one bearing 62, such as a ball bearing. The bearing 62 is preferably located inboard of the first bevel gear 64.

The end of the axle shaft 46 has a bevel gear mounted for rotation with the axle shaft 46, hereinafter called a horizontal bevel gear 64. It should be appreciated that the axle arm portions 16 and axle shaft 48 are connected to the shoulder structure 18B in a similar manner. In light of the similarity between the two sides of the axle assembly 10, only one side will be described and depicted below and in the accompanying figures.

FIG. 3 also depicts a non-horizontal or a vertically oriented shaft 66 mounted for rotation within the shoulder structure 18A. A least one bearing 68, such as a ball bearing, is located between the shaft 66 and the shoulder structure 18A to facilitate rotation of the shaft 66. More specifically, it is preferred that the bearing 68 is located above the second bevel gear 70. The bearing 68 is held in place by a snap ring 82. The vertically oriented shaft 66 has a bevel gear mounted for rotation with the shaft, hereinafter called a vertical bevel gear 70.

In the preferred embodiment depicted in FIG. 3, the vertical bevel gear 70 and the horizontal bevel gear 64 are meshed with one another to provide drive to the shaft 66. In a most preferred embodiment, the vertical bevel gear 70 is located above the horizontal bevel gear 64.

FIG. 3 also depicts a fluid tight first cover 76 located over an opening 80 in the shoulder structure 18A. The first cover 76 is preferably formed of a stamped metal material and secured in place by a press fit and sealed with sealant. The cover 76 may also be secured to the shoulder structure 18A with mechanical fasteners, interlocking elements and/or friction fittings, by way of example only. Regardless of the above-mentioned methods of attachment of the cover 76 to the shoulder structure 18A, it is preferred that the cover 76 be removably secured for purposes of installation, maintenance and repair of the above-mentioned bearings and gears.

The opening 80 permits installation of the bearing 62 for the axle shaft 46 and the horizontal bevel gear 64 on the axle shaft 46. Additionally, the opening 80 permits installation of the bearing 68, shaft 66 and vertical bevel gear 70.

Those skilled in the art will appreciate that lubricating fluid is located in the shoulder structure 18A. As shown in FIG. 3, a seal 84 is preferably located about the shaft 66 to prevent the lubricating fluid from escaping from the shoulder structure 18A. The seal 84 may be such a lubricated-for-life seal and the lubricating fluid may be grease or oil. All seals identified below may be such as the above-described seal.

A bevel gear (not shown) is located at the end of the shaft 66 to mesh with a bevel gear (not shown) of the wheel end 20 to provide drive to the wheel end components, as known by those skilled in the art.

It should be appreciated that the axle arm portion 14 permits communication of lubricating fluid between the center section 12 and the shoulder structure 18A. The axle arm portion 16 similarly communicates lubricating fluid between the center section 12 and the shoulder structure 18B associated with the axle arm portion 16.

Figure 4:
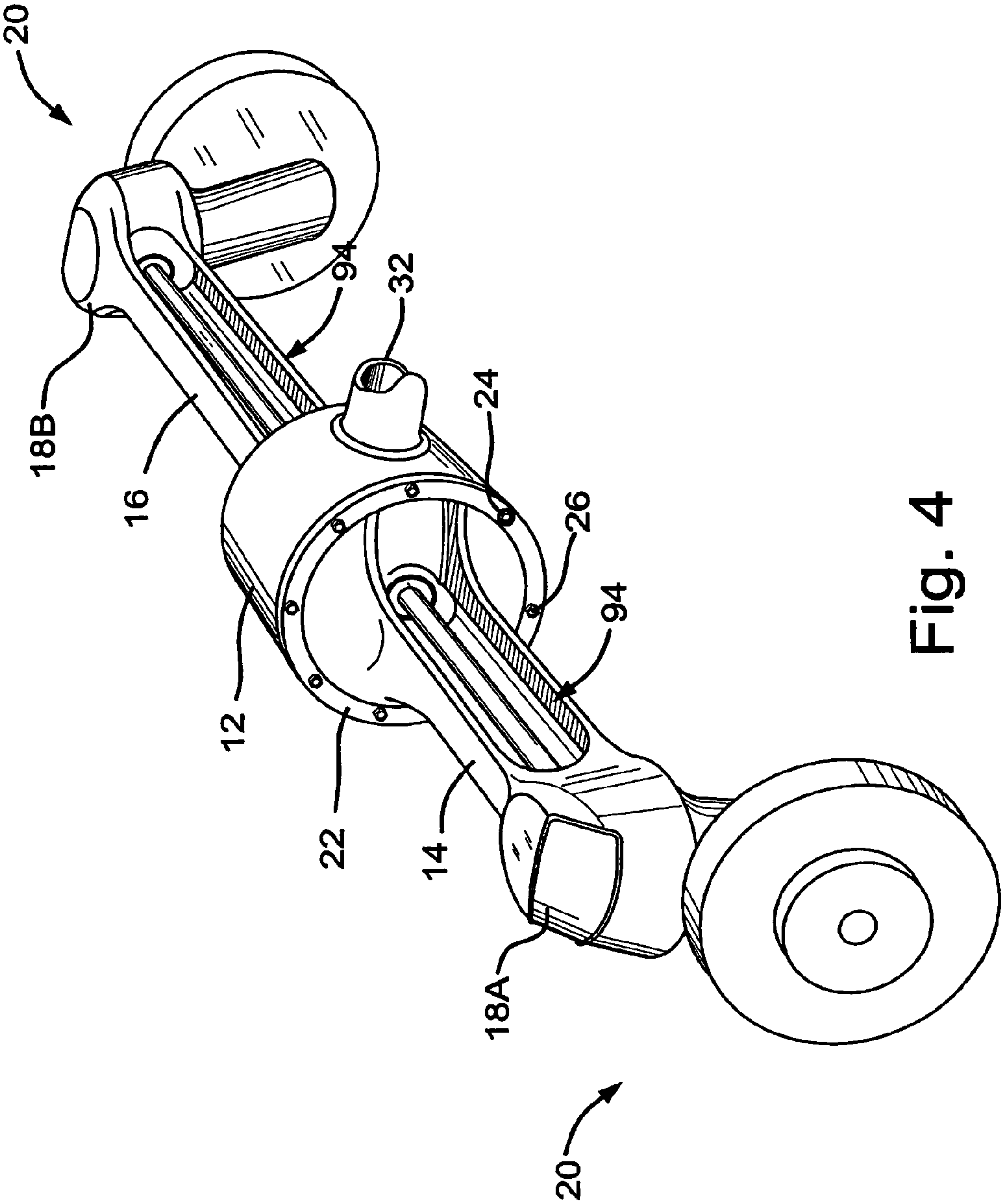
FIG. 4 is a schematic, perspective view of another embodiment of the present invention.

FIG. 4 is a schematic, perspective view of yet another embodiment of the present invention. The invention depicted in FIG. 4 is substantially identical to the above-described invention except as indicated below.

As depicted in FIG. 4, the first and second axle arm portions 14, 16 are preferably not fully enclosed. More preferably, the first and second axle arm portions 14, 16 are comprised of a top portion 40, a bottom portion 50, a forward portion 52 and a rearward portion 94. Preferably, the top portion 40, the bottom portion 50 and the forward portion 52 are substantially closed. The rearward portion 94 of the first and second axle arm portions 14, 16 is open.

Figure 5:
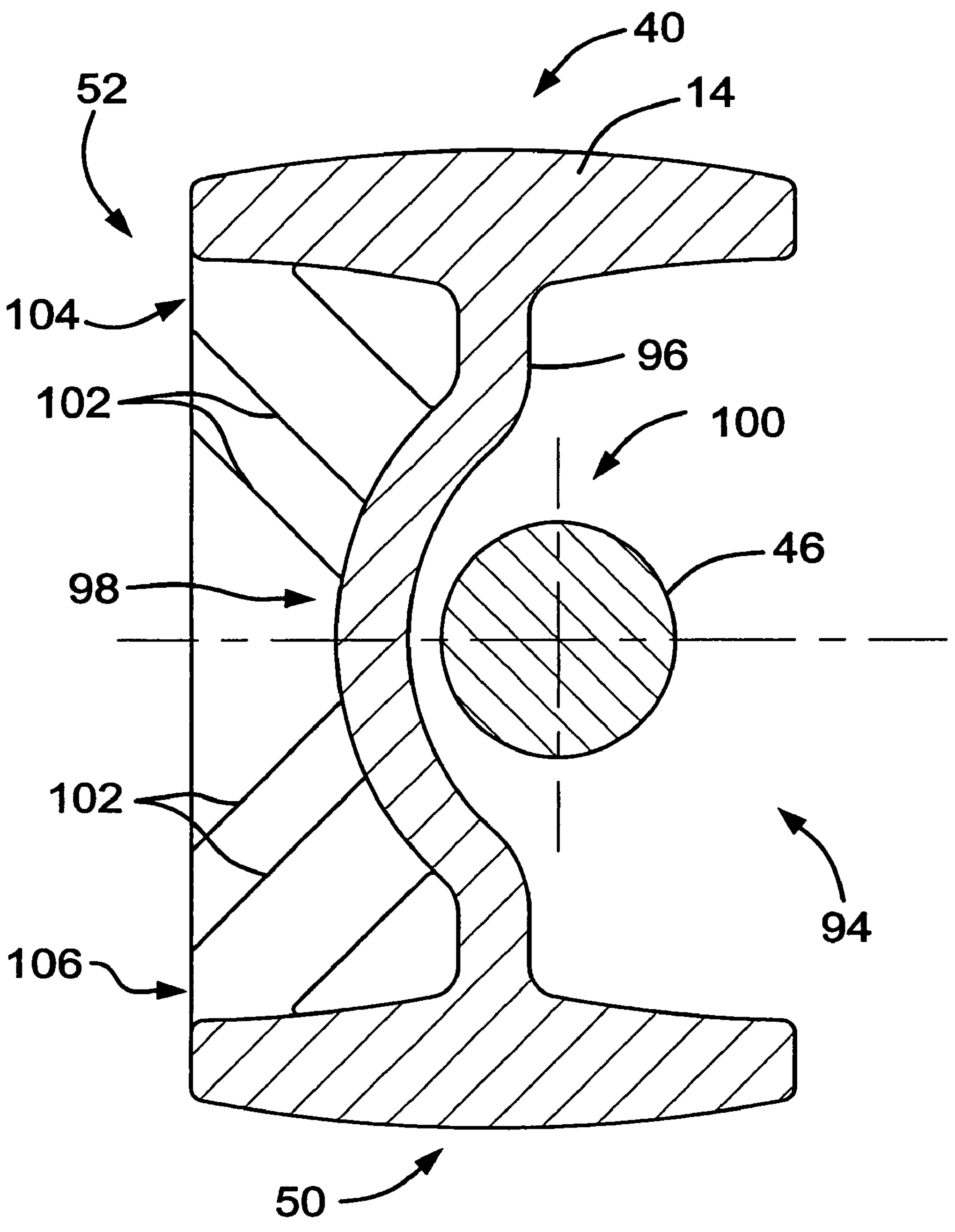
FIG. 5 is a schematic, side view of a component of the invention depicted in FIG. 4.

A schematic side view of one of the axle arm portions 14 is depicted in FIG. 5. The axle shaft 46 is shown adjacent a wall 96 of the axle arm portion 14. The wall 96 preferably has an outwardly extending bow 98 to accommodate the axle shaft 46. Preferably, the axle shaft 46 is located on the backside 100 of the wall 98.

It should be appreciated that the present discussion of the axle arm portion 14, its associated axle shaft 46 and the shoulder structure 18A applies equally to the axle arm portion 16, its associated axle shaft 48 and its shoulder structure 18B on the other side of the center section 12.

One or more strengthening ribs 102 may be connect the wall 96 with an upper and/or a lower portion 104, 106 of the axle arm portion 14, as shown in FIG. 5. It should be appreciated, however, that the present invention works equally well without the ribs.

In yet another embodiment, a plate (not shown), such as a metal stamping, may be located across the rearward portion 94 of the axle arm portion 14 to protect and shield the axle shaft 46.

Those skilled in the art will appreciate that the present invention is not limited to the preferred embodiment of the open axle arm portion depicted in the Figures. Other open axle arm portions are well within the scope of the present invention.

Figure 6:
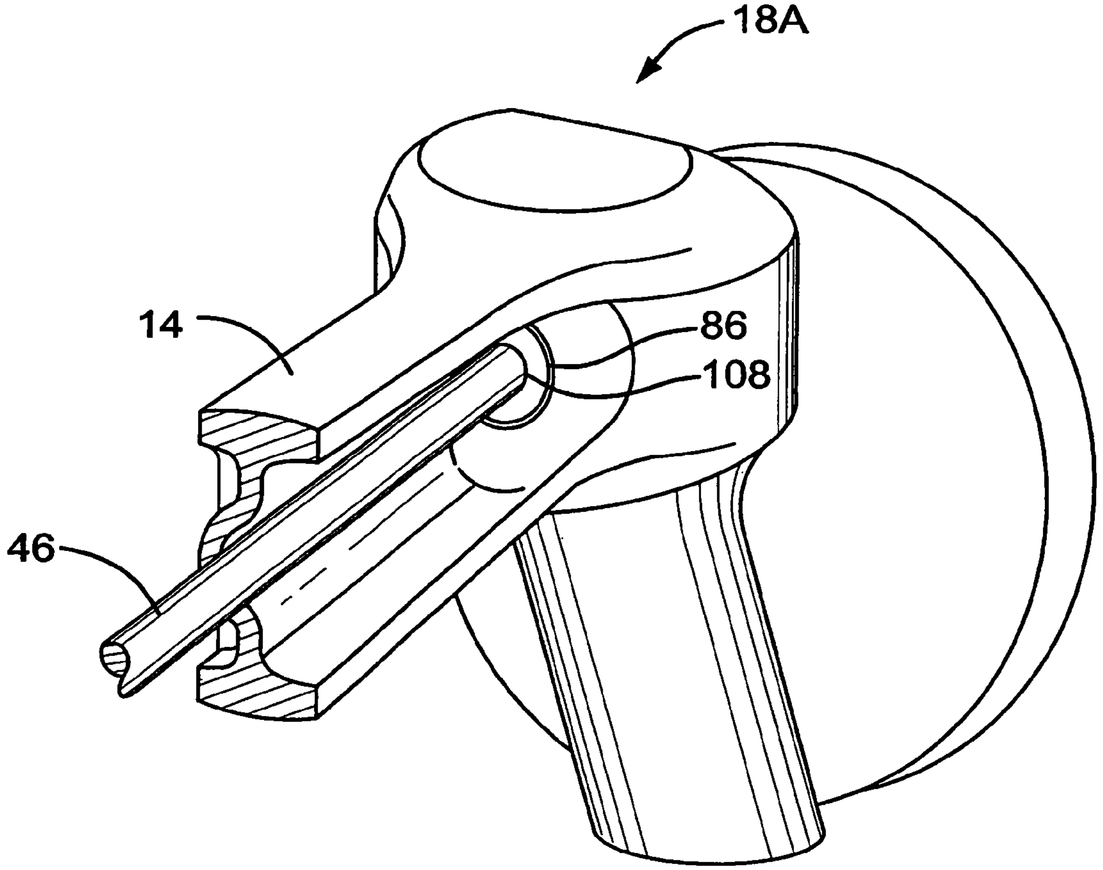
FIG. 6 is a schematic, perspective partial view of a component of the invention depicted in FIG. 4.

As best seen in FIG. 6, the axle shaft 46 extends to the shoulder structure 18A and enters the shoulder structure 18A through an aperture 108. Preferably, a seal 86 is located adjacent the aperture 108 to prevent lubricating fluid from escaping from the shoulder structure 18A.

One axle shaft also extends through an aperture (not shown) in the housing joint 22. Preferably, a seal (not shown) is located about the axle shaft adjacent the aperture to contain the lubricating fluid in the center section 12. Additionally, the other axle shaft extends through an aperture (not shown) in the center section 12. It is also preferred that a seal (not shown) is located about that axle shaft adjacent the aperture to contain the lubricating fluid in the center section 12.

Figure 7:
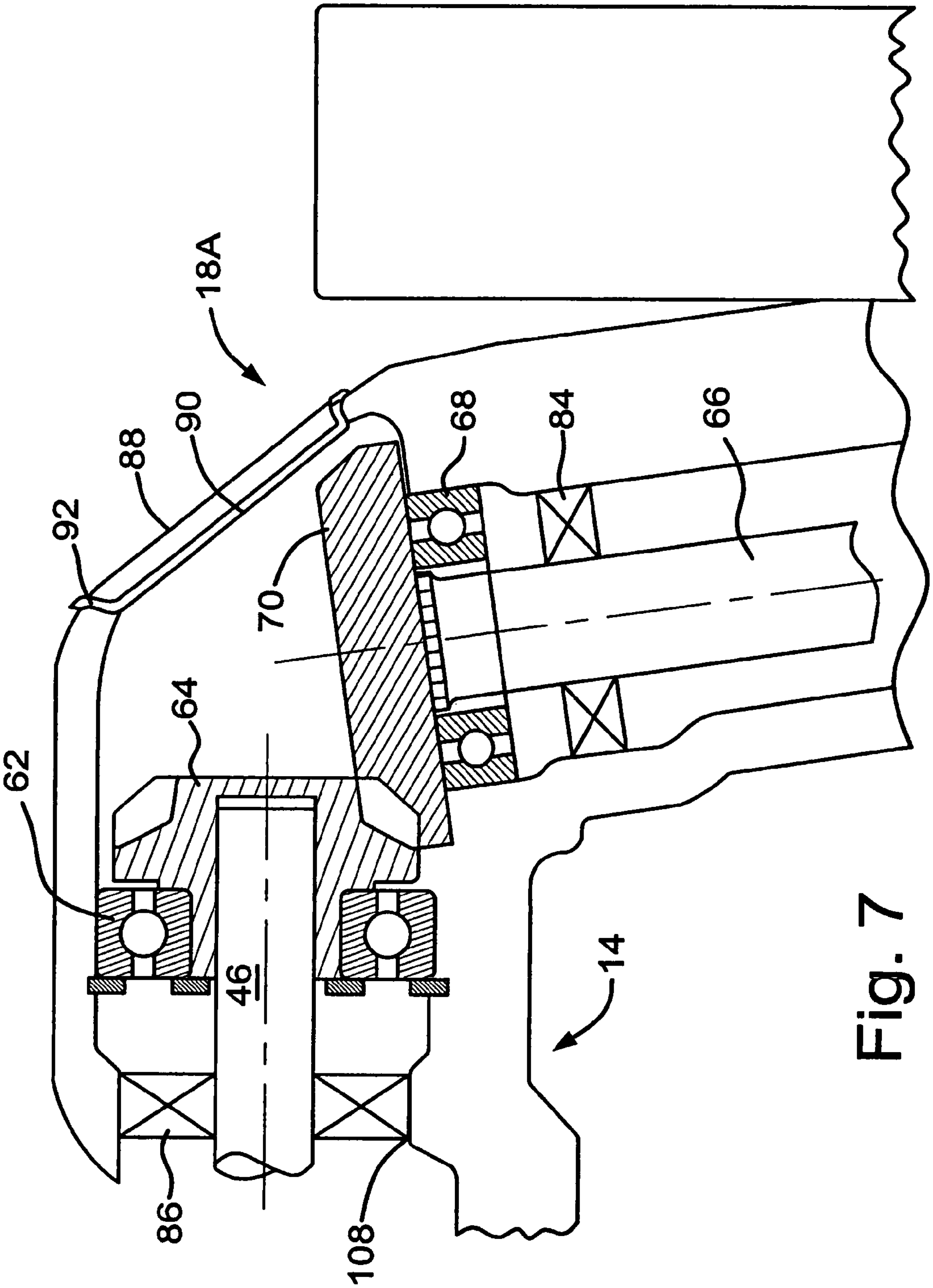
FIG. 7 is a schematic, partial side view of the component depicted in FIG. 6.

A partial, cut-away side view of the shoulder structure 18A is schematically shown in FIG. 7. In FIG. 7, the open axle arm portion 14 and the axle shaft 46 are depicted. The seal 86 is shown about the axle shaft 46 adjacent the bearing 62 for the axle shaft 46. The axle shaft 46 has a bevel gear, referred herein as a horizontal bevel gear 64, that meshes with a bevel gear, referred herein as a vertical bevel gear 70, of a vertically oriented shaft 66. As shown in FIG. 7, the vertical bevel gear 70 is located below the horizontal bevel gear 64. A bearing 68 and a seal 84 are located about the vertically oriented shaft 66.

A cover 88, preferably constructed of stamped metal, is secured to the shoulder structure 18A over an opening 90. The cover 88 is secured to the shoulder structure 18A preferably with a press fit and sealant. The cover 88 may also be secured to the shoulder structure 18A with one or more mechanical fasteners. As described above, the opening 90 allows for installation of the axle shaft 46, bearings 62, 68, seals 84, 86, and bevel gears 64, 70 in the shoulder structure 18A. Regardless of which method is used to attach the cover 88 to the shoulder structure 18A, it is preferred that the cover 88 be removably attached for purposes of installation, repair and maintenance.

In light of the above, it can be appreciated that the lubricating fluid in the shoulder structures 18A and 18B and the lubricating fluid in the center section 12 is in not communication with one another. Additionally, it can be appreciated that there is no lubricating fluid in the first or second axle arm portions 14, 16.

It can be appreciated that for the embodiment of the invention depicted in FIGS. 4-7, by not having any lubricating fluid in the axle arm portions 14, 16, the lubricating fluid required for the axle assembly 10 is reduced and the amount of churning experienced by the lubricating fluid is reduced. Reducing the churning of the lubricating fluid in the shoulder joints 18A, 18B reduces the amount of heat generated and reduces parasitic losses in the shoulder joints 18A, 18B and the wheel ends 20.

Figure 8:
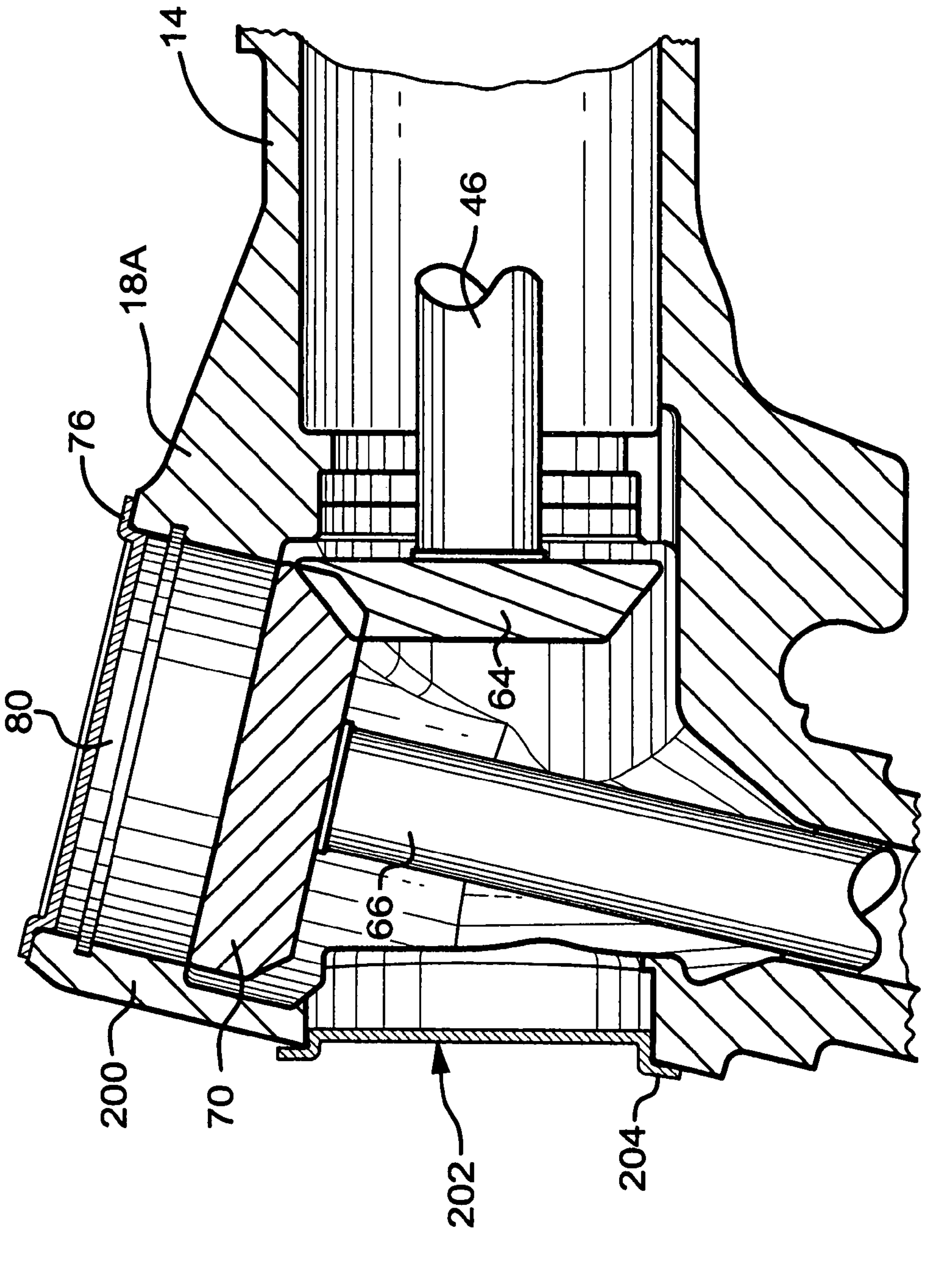
FIG. 8 is a schematic, partial cut-away view of a component of the present invention.
Figure 9:
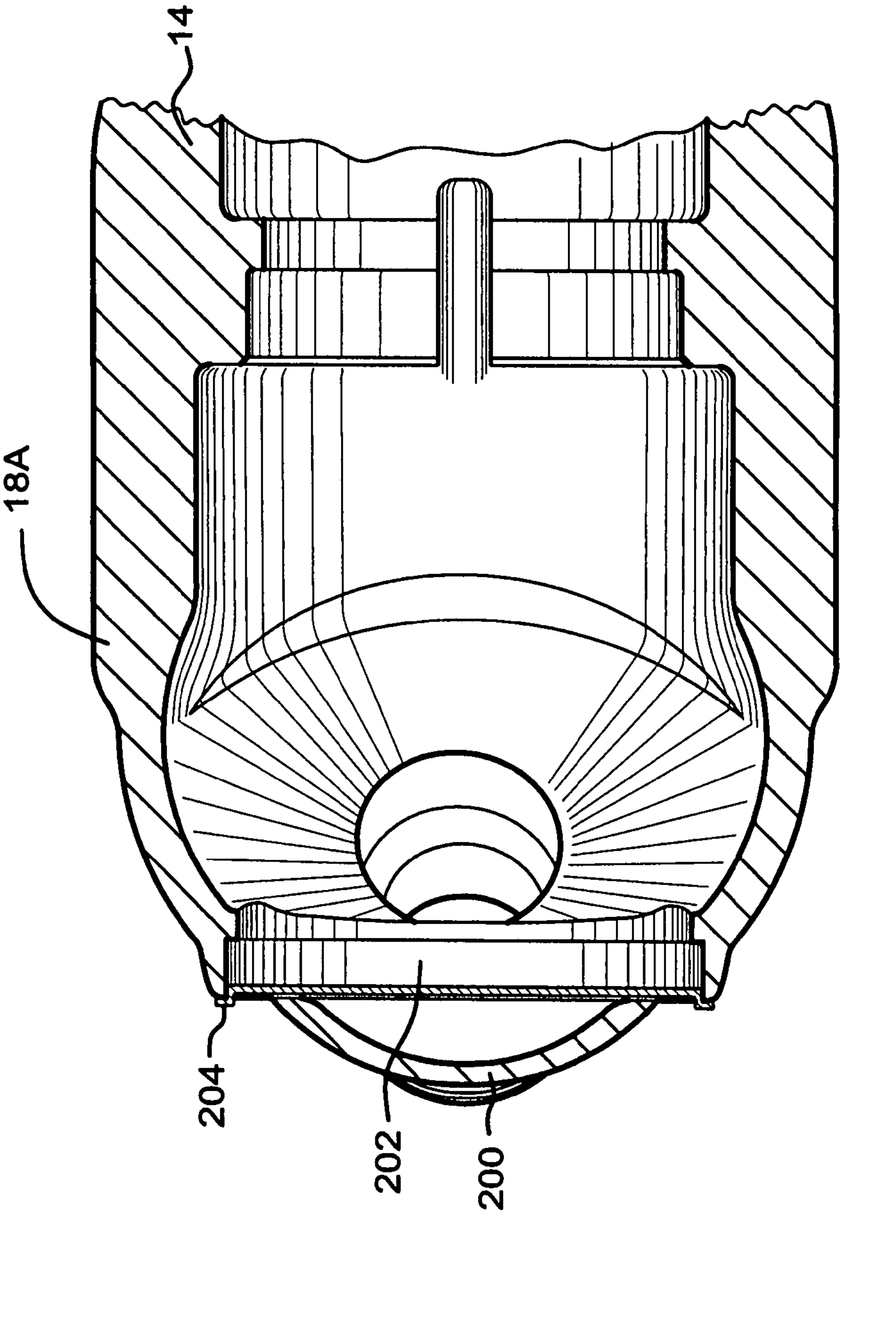
FIG. 9 is a schematic, partial cut-away plan view of the component depicted in FIG. 8.

Turning now to FIGS. 8 and 9, another embodiment is depicted. It can be readily appreciated that the embodiment of these figures can be used with either the fluid containing axle arm portion best seen in FIGS. 1-3 or the open axle arm portion best seen in FIGS. 4-6.

For illustrative purposes only, the following description of FIGS. 8 and 9 will be used in combination with the embodiment of FIGS. 1-3 and the written description above for these figures. Thus, the same reference number will be used to describe FIGS. 8 and 9.

FIGS. 8 and 9 both depict the axle arm portion 14, the shoulder structure 18A and opening 80 (not in FIG. 9). Bearing 62 and 68 and snap ring 82 are not depicted but can be readily appreciated from the above disclosure.

FIGS. 8 and 9 further depict an outboard wall 200 in the shoulder structure 18A having an opening 202. Being located in the outboard wall 200, it can be readily appreciated that the opening 202 is outboard of the bevel gear 64. The opening 202 may be axially aligned with the shaft 46.

A fluid tight cover 204 is preferably located over the opening 202 to seal in fluid. The cover 204 may be formed from a stamped metal material and secured in place by a press fit and sealed with a sealant. The cover 204 may also be secured in place by mechanical fasteners, interlocking elements and/or friction fittings, by way of example only. It is preferred that the cover 204 be removably secured to the shoulder structure 18A for purposes of installation, maintenance and repair of at least the above mentioned gears and bearings.

Opening 80 and its cover 76, as previously discussed, are also preferably utilized as shown in FIGS. 8 and 9. As best seen in FIG. 8, the cover 76 and opening 80 are located above bevel gear 76 and bevel gar 64 as well as above opening 202 and cover 204 in the shoulder 18A.

Openings 80 and 202 permit the installation of bearings 62, 68, the gears 64, 70 and the shafts 46, 66. The openings 80, 202 also permit the arm portion (such as 14), and the shoulder structure (such as 18A), to be prepared (such as through machining) to receive these components.

Openings 80 and 202 are depicted as curvilinear, such as round or oval. The present invention, however, is not limited to just these shapes. Instead openings of any shape and size may be used which still permit the required installation, maintenance and repair.

In accordance with the provisions of the patent statutes, the present invention has been described in what is considered to represent its preferred embodiments. However, it should be noted that the invention can be practiced otherwise than as specifically illustrated and described without departing from its spirit or scope.

What we claim:

1. A drive axle assembly, comprising:

at least one axle arm portion extending from a differential housing to a shoulder structure that is unitary with an outboard end of said axle arm portion;

a substantially horizontal drive shaft located within said at least one axle arm portion connected at an inboard end to a differential in said differential housing and having a first bevel gear on an outboard end; and a non-horizontal driven shaft mounted for rotation within said shoulder structure, said driven shaft having a second bevel gear meshed in driving engagement with said first bevel gear on said drive shaft;

wherein said shoulder structure, directly above said second bevel gear consists of, in order, a bearing, a snap ring, and a selectively closable opening solely closed with a cover with two parallel and planar inner and outer surfaces for access thereto.

2. The assembly of claim 1, further comprising a second selectively closeably opening is axially aligned with said substantially horizontal drive shaft located outboard from said second bevel gear and substantially perpendicular to said drive shaft.

3. The assembly of claim 1, wherein said selectively closable opening is oriented substantially perpendicular to said driven shaft.

4. The assembly of claim 1, wherein said second bevel gear is meshed with an upper portion of said first bevel gear.

5. The assembly of claim 1, wherein said cover is a stamped metallic press-fit cover within said selectively closable opening.

6. A drive axle assembly, comprising:

at least one axle arm portion extending from a differential housing to a shoulder structure that is unitary with an outboard end of said axle arm portion;

a substantially horizontal drive shaft located within said at least one axle arm portion connected at an inboard end to a differential in said differential housing and having a first bevel gear on an outboard end; and a non-horizontal driven shaft mounted for rotation within said shoulder structure, said driven shaft having a second bevel gear meshed in driving engagement with said first bevel gear on said drive shaft, wherein said first bevel gear is disposed above said second bevel gear;

wherein said shoulder structure is provided with an upper selectively closable opening about both said meshed first and second bevel gears, said upper selectively closeable opening located entirely axially outboard of said first bevel gear and solely closed with a cover with two parallel and planar inner and outer surfaces for access thereto.

7. The assembly of claim 6, wherein said first bevel gear is meshed with an upper portion of said second bevel gear.

8. The assembly of claim 6, wherein said selectively closeable cover is a stamped metallic press-fit cover within said selectively closeable opening.

* * * * *